Figure 1:
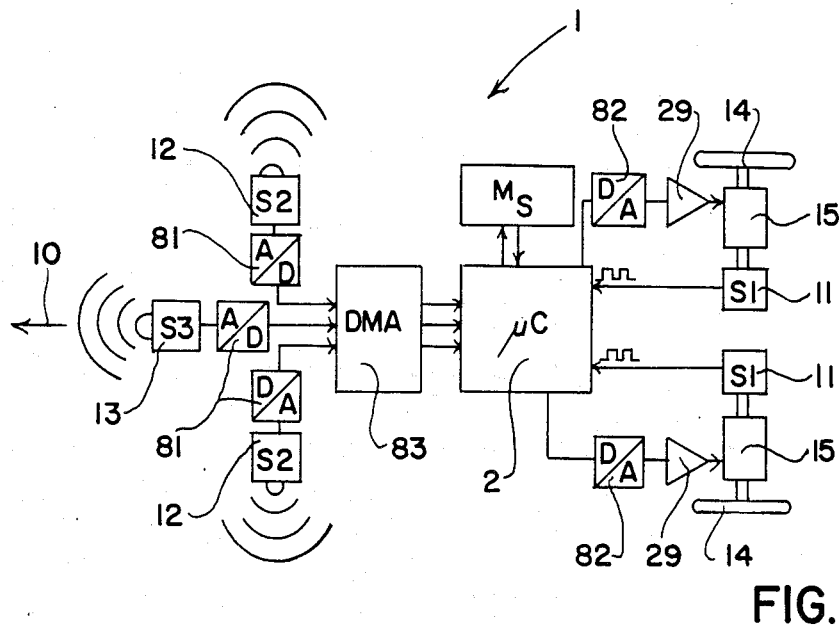

United States Patent [19]

Knepper

[11] Patent Number: 4,700,427

[45] Date of Patent: Oct. 20, 1987

[54] METHOD OF AUTOMATICALLY STEERING SELF-PROPELLED FLOOR-CLEANING MACHINES AND FLOOR-CLEANING MACHINE FOR PRACTICING THE METHOD

[76] Inventor: Hans-Reinhard Knepper, Pfalzgrafenstrasse 80, D-4200 Oberhausen, Fed. Rep. of Germany

[21] Appl. No.: 919,221

[22] Filed: Oct. 15, 1986

[30] Foreign Application Priority Data

Oct. 17, 1985 [DE] Fed. Rep. of Germany ....... 3536973

[51] Int. Cl.⁴ .............................................. B62D 11/04
[52] U.S. Cl. .......................................... 15/319; 15/340; 180/169; 318/587
[58] Field of Search .................. 15/319, 320, 339, 340; 180/169; 318/587

[56] References Cited

U.S. PATENT DOCUMENTS

| | | | |
|---|---|---|---|
| 3,744,586 | 7/1973 | Leinauer | 180/169 X |
| 3,789,939 | 2/1974 | Geislinger | 15/319 X |
| 3,952,361 | 4/1976 | Wilkins | 15/319 |
| 4,114,711 | 9/1978 | Wilkins | 15/319 X |
| 4,413,210 | 11/1983 | Gronau | 180/169 X |
| 4,593,239 | 6/1986 | Yamamoto | 180/169 X |
| 4,623,032 | 11/1986 | Kemmer | 180/169 |

*Primary Examiner*—Chris K. Moore
*Attorney, Agent, or Firm*—Felfe & Lynch

[57] ABSTRACT

The invention concerns a method of automatically steering a self-propelled floor-cleaning machine along a predetermined path of motion on a limited area to be worked, wherein a sequence of path segments stored in a data memory is retrieved, and the path segments travelled by the machine, and wherein markings are recognized by at least one sensor and converted into course-correcting control commands actuating and/or steering the machine. Linear structures present on or above the area to be worked are used as markings along the path of motion, such that, on first segments its path, the floor-cleaning machine is steered parallel to recognized structures by at least one laterally pointing telemeter such as an ultrasound or laser telemeter, and that on second segments of its path, the floor-cleaning machine travels freely, without guidance by existing structures, from the end of a recognized structure to the beginning of the next structure which can be recognized. Furthermore the invention concerns a floor-cleaning machine, comprising a chassis with independently driven left and right wheels and steering means, and a control unit controlling the drive wheels and steering means in dependence upon data stored in a data memory and upon data supplied by position-recognizing sensors. On both driven wheels are mounted angular-momentum transducers as first sensors, and on at least one of the long sides of the machine is provided at least one telemeter such as a ultrasound or laser range finder as a second sensor.

9 Claims, 2 Drawing Figures

METHOD OF AUTOMATICALLY STEERING SELF-PROPELLED FLOOR-CLEANING MACHINES AND FLOOR-CLEANING MACHINE FOR PRACTICING THE METHOD

The invention refers to a method of automatically steering self-propelled floor-cleaning machines along a predetermined path of motion on a limited area to be worked, wherein a sequence of path segments stored in a data memory is retrieved and covered by the machine and wherein markings are recognized by at least one sensor and converted into course-correcting control commands for actuating and/or steering the machine. Furthermore, the invention relates to a floor-cleaning machine for practicing the method, comprising a chassis with driving and steering means, with means for dry and/or wet cleaning of the floor area covered, with a data memory for storing a retrievable sequence of path segments, and a control unit controlling the driving and/steering means in dependence upon the data stored in the data memory and upon data provided by position-recognizing sensors.

A method, as well as a machine, of the above-specified type are known. Thus, DE-PS No. 29 10 490 describes a method of automatically steering vehicles along a predetermined path and apparatus for practicing such a method. The disadvantage of this method and of the corresponding apparatus result from the fact that markings, which are provided on the path and have patterns representing various types of steering information, must be scanned and recognized with expensive technical means, namely a television camera. Apart from the high expenditures for the electronic equipment, it is a disadvantage that markings serving for this particular purpose need be provided along the path of motion on, for example, the floor surface. These markings easily become unrecognizable for the vehicle as a consequence of damage or some other effect so that safe operation is not guaranteed.

DE-OS No. 26 00 907 describes a floor-treating machine which is provided with distance-monitoring means to control, during operation, the deviation of the machine's course from a recorded track and with means correcting the course in the presence of such deviations. In that case, the fact that the distance monitoring is effected with the aid of special reflectors mounted above the path of motion is of disadvantage. Installation of the reflectors is expensive and results in low adaptability of the machine in regard to changes of the predetermined path.

DE-OS No. 31 13 086 shows a positioning-sensor system for automatically steered vehicles. However, this system requires reflecting surfaces which must be situated precisely perpendicular to the floor surface and under right angles relative to each other and must always be "visible" for the vehicle. Also in that case relatively high expenses for installation are required and limitations exist in the operation of the vehicle.

Therefore there arises the problem of devising a method of the above-specified type which avoids the mentioned disadvantages and which, in particular, does not require installed accessories and, at the same time, exhibits high safety of operation and adaptability in its utilization. Furthermore, there arises the problem of creating a floor-cleaning machine of the above-specified type for practicing the method, which also avoids the above-mentioned disadvantages, and which machine is reliable in its operation, requires relatively few technical means, and, hence, can be manufactured at low cost.

According to the invention, the first of the problems indicated is solved by a method of the above-specified type, as set forth in the characterizing part of claim 1. It is the particular advantage of the method according to the invention that existing structures are used for steering the machine so that no additional installations along the path envisaged are required. Structures of the required type, e.g., shelves and limiting walls, are present in practically all the regions for which the use of the floor-cleaning machine is contemplated. Thus, there exist no limitations in regard to using the method in practice. Path segments on which orientation by way of structures extending parallel to the path is not possible are traversed without control. Since these freely traversed segments are short in comparison with the path segments of controlled motion, deviations from the path hardly occur in practice with a floor-cleaning machine steered by the method of the invention.

In order to guarantee an adjustment as precise as possible before the machine starts on a freely travelled segment of the path, the adjustment of the floor-cleaning machine relative to a recognized structure is advantageously checked in the final portion of a structure recognized and, if there is a deviation from parallel alignment, the adjustment is corrected by corresponding commands to the driving and/or steering means.

Two methods are preferably employed for verifying the adjustment: In the first method, the adjustment relative to the recognized structure takes place in the final portion of the latter by comparing several consecutive distance measurements of the moving floor-cleaning machine. The advantage of this method is that a single telemeter suffices. However, when the machine is at rest, the verification cannot be performed. This disadvantage is avoided in the second method in which the adjustment of the floor-cleaning machine relative to the recognized structure is verified in the final portion of the structure by simultaneous comparison of two range measurements made by two telemeters mounted on one longitudinal side of the machine while the machine moves or is at rest. This provides information on the machine's alignment through the difference of the measurement results obtained from the two simultaneously operated telemeters and the alignment of the machine can be verified when the machine is at rest as well as when the machine is moving.

In order to avoid disturbances in the operation of the floor-cleaning machine and to provide for a highly adaptable utilization of the machine requiring little checking by men, obstacles encountered in the course of a predetermined path are recognized by appropriate sensors such as mechanical and/or optical and/or acoustic sensors disposed preferably on the front side of the floor-cleaning machine and, when these sensors respond, a data-memory-stored program for automatically bypassing the obstacle and regaining the predetermined path is activated. In this way the machine by itself bypasses smaller obstacles and subsequently continues and works on its predetermined path.

Two alternatives are provided for generating the path-segment data stored in the data memory of the floor-cleaning machine: In the one alternative, the data are generated by teach-in during a manually controlled travelling over the area to be worked. After the teach-in travel, the machine retravels the path memorized, and this retravelling advantageously takes place at a velocity increased relative to the teach-in travel and, hence, within a shorter time. In the second alternative, the data are generated by automatically travelling the area to be worked under the control of a program with rules for automatic path finding to fully cover the area while the path segments travelled are stored at the same time, and, if necessary, the path is subsequently optimized by minimizing the total path length and/or the total working time and corresponding path-segment data are generated. This alternative offers the advantage that, if the machine is used for the first time in an environment "unknown" to the machine, manual steering is not required. But this necessitates more programming and a larger data memory. The selection of the data generation method depends basically upon whether the place of machine operation is frequently changed or whether continued changes are made in the room in which the machine is used.

When the place of use is frequently changed or when the rooms are modified, the second alternative in general will have to be preferred. The ensuing optimization serves to minimize the path length and the working time. Algorithms for such a problem and their solution are known per se and can be transferred by those skilled in the art to the field of the invention.

According to the invention, the second part of the problem is solved by a floor-cleaning machine of the above-specified type as recited in the characterizing part of claim 8. Since the wheels are individually driven, no active steering device is required but one or two pivotable alignment wheels suffice. Furthermore, by this configuration, and particularly with drive means which can be operated in the backward direction, excellent maneuverability of the machine is achieved and this is very advantageous for the use of the machine in, for example, supermarkets. Angular-momentum transducers associated each with one of the wheels serve to measure the path travelled. As an additional sensor there is provided at least one telemeter which determines the machine's distance perpendicular to the path of motion from structures located to the side of the machine. In modified versions of the machine, one or two horizontally spaced telemeters can be provided on both long sides of the machine. Moreover, for safety reasons, a plurality of telemeters can be mounted one on top of the other if this is required by the structures to be recognized.

Furthermore, the machine is provided with sensors such as mechanical and/or optical and/or acoustic sensors as third sensors for recognizing obstacles and triggering bypassing or emergency-stop maneuvers. In this way, evasive maneuvers are facilitated on the one hand and safeguarding against accidents implying damage to property or even persons is obtained, on the other hand, as required for the practical use.

Figure 2:
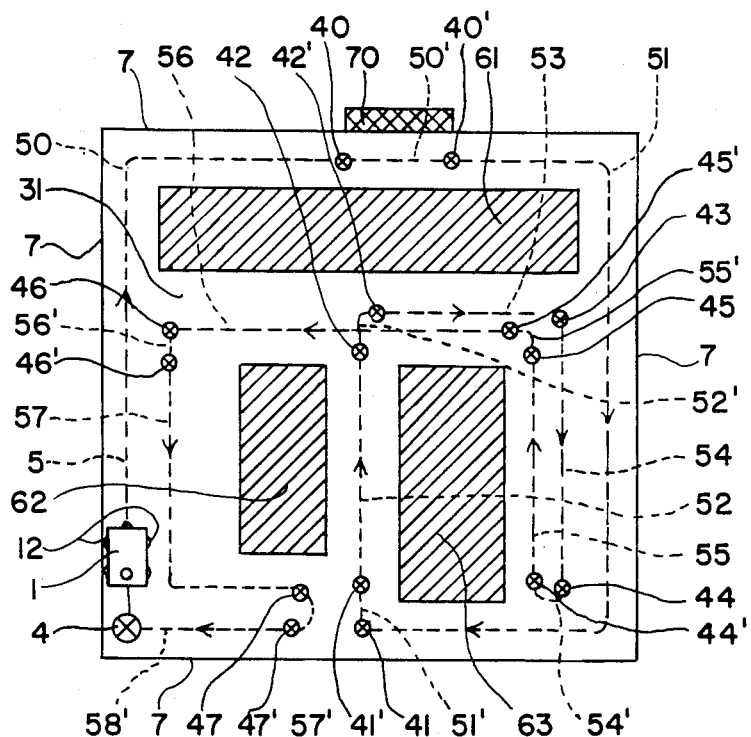

The invention is explained below by way of an example with reference to a drawing. The figures of the drawing show:

FIG. 1 a schematic representation of the floor-cleaning machine according to the invention, and FIG. 2 a schematic representation of an exemplary use of the machine.

As illustrated by FIG. 1 of the drawing, the schematically shown embodiment of floor-cleaning machine 1 of the invention comprises a microcomputer as a steering unit 2 with a plurality of associated components. Wheels 14, each of which is independently driven by a motor 15, are used to propel machine 1. The two motors 15 are controlled from microcomputer 2 via digital-/analog converters 82 and amplifiers 29. Two angular-momentum transducers 11 serve as the first sensors of machine 1 to measure the path travelled by each of wheels 14. One angular-momentum transducer 11 is permanently associated with one motor 15 or one wheel 14. Each of the angular-momentum transducers 11 inputs its information into microcomputer 2 in the form of sequences of rectangular signals.

A data and program memory 21 is assigned to microcomputer 2 to store data and programs. A memory permanently installed in machine 1 can form memory 21; the memory may also be fully or partially portable such as a magnetic tape cartridge or diskette.

Machine 1 is provided with telemeters 12 as second sensors which are preferably disposed so that they determine the lateral distance of machine 1 from structures extending laterally besides the path under approximately right angles to the direction of motion. Telemeters 12 feed their measured data through analog-digital converters 71 first to intermediate memory 83 which, in turn, is connected to control unit 2, i.e., the microcomputer.

In the embodiment of machine 1 shown, the third sensor is a telemeter 13 which is effective in the direction of motion indicated by arrow 10. Like telemeters 12, telemeter 13 is an ultrasonic or laser range finder. Telemeter 13 serves to recognize obstacles which are situated on the envisaged path of machine 1. Also telemeter 13 delivers its measurement data through an analog-digital converter 81 first to intermediate memory 83 and from that to control unit 2.

For the sake of clarity, tools for treating the floor, as well as other components of the chassis, for instance one or two pivotable alignment wheels, are not shown in FIG. 1.

During operation of machine 1, the method of automatically steering machine 1 functions as follows:

Data concerning path segments are retrieved in succession from memory 21 wherein such data are stored and applied as maneuvering commands to motors 15 of drive wheels 14. Correct execution of the commands is monitored by the first sensors, the angular-momentum transducers 11, and by the second sensors, the telemeters 12. The data concerning the path segments are composed of information on the paths to be travelled and the distances to be laterally maintained from structures on the path of travel.

When lateral guiding structures are missing, machine 1 travels freely, i.e., without being controlled by second sensors 12. On these path segments without steering, control is effected only through the first sensors, i.e., through the angular-momentum transducers 11.

In order to obtain very precise positioning of machine 1 in the desired direction of motion before the start of a freely travelled path segment, the adjustment of the machine is verified in accordance with the above description and as set forth in claims 2–4.

Generation of the data stored in memory 21 has been described earlier. As described, those data can be generated by, for example, inputting data via a keyboard or in some other conventional fashion.

When obstacles are present on the predetermined path, a response is obtained from the third sensor, i.e., from telemeter 13. This sensor preferably activates a bypass program likewise stored in memory 21, with machine 1 making a detour around the obstacle under the control of the program and returning to the predetermined path.

FIG. 2 shows in schematic simplified form an example of the use of machine 1 controlled by the method of the invention. FIG. 2 illustrates a room confined on all sides by limiting wall 7; the room has a floor area 31 on which a number of shelves 61, 62 and 63 were placed. Free floor areas, which are to be cleaned, remain between individual shelves 61–63 and between shelves 61–63 and outer wall 7. The free floor areas are worked along a path 5 (denoted by the dashed line) by machine 1 which, in the example of FIG. 2, is positioned in the lower left corner close to a starting point 4. Path 5 is subdivided into segments some of which are travelled under control by lateral telemeters 12, whereas some other are covered without control by lateral telemeters 12.

When path 5 is travelled, the following example of the method results:

Starting from point 4, machine 1 first is guided by outer walls 7 extending to the left of the machine when viewed in the direction of motion; the machine proceeds until the end of the first path segment 50 has been reached after a right turn. This end point of first path segment 50 of steered motion is indicated by the marking denoted by reference number 40. At this point outer wall 7 is interrupted by a structure 70 unsuitable for guiding the machine. Therefore guidance through the left telemeter 12 of the machine cannot be effected at this point. There exists the possibility of having machine 1 move in free travel to point 40' from where the machine can orientate itself again with the aid of its left telemeter 12 responding to outer wall 7. Activation of right telemeter 12 is a second possibility so that then the machine is guided by the edge at shelf 61 facing the machine.

Apart from freely travelled straight stretches such as path length 50', there can exist freely travelled curved segments such as segment 54'. As can be seen from FIG. 2, freely travelled segments 50'–57' are relatively short, whereas segments 50–58 travelled under control are comparatively much longer, Excessive deviations from the predetermined path of machine 1 cannot occur in practice.

The form of the path is in no way restricted but can be freely chosen and optimized with respect to the path length travelled or to working time. Furthermore, it is not necessary that starting point 4 coincide with the end point of the path, as indicated in the figure; the end point can be situated in any part of area 31 to be worked.

I claim:

1. A method of automatically steering a self-propelled floor-cleaning machine along a predetermined path of motion on a limited area to be worked, comprising:
   retrieving a sequence of path segments stored in a data memory;
   recognizing markings by at least one sensor on the machine;
   converting said markings into course-correcting control commands steering the machine;
   using linear structures present on or above the area to be worked as markings along the path of motion such that on first segments of its path the floor-cleaning machine is steered parallel to recognized structures by at least one laterally pointing telemeter, and that on second segments of its path the floor-cleaning machine travels freely without guidance by existing structures, from the end of a recognized structure to the beginning of the next structure which can be recognized.

2. A method according to claim 1, comprising independently verifying, in the final portion of a structure recognized, the floor-cleaning machine's positioning with respect to the recognized structure and, in the case of a deviation from parallel adjustment, correcting the adjustment through commands to the steering means.

3. A method according to claim 1, comprising effecting the adjustment of the floor-cleaning machine relative to the recognized structure in the final portion of the structure by comparing a plurality of successive range measurements while the floor-cleaning machine is moving.

4. A method according to claim 1, comprising effecting the adjustment of the floor-cleaning machine relative to the recognized structure by comparing range measurements made simultaneously by two telemeters mounted on one long side of the machine.

5. A method according to claim 1, comprising recognizing obstacles on the predetermined path of motion by appropriate sensors disposed on the front of the machine and, upon response of the sensors, activating a program stored in the data memory and designated for automatically initiating a detour around the obstacle and regaining the predetermined path.

6. A method according to claim 1, comprising generating by teach-in during a manually guided travel over the area to be worked, including storing the data in the data memory for the path segments to be travelled.

7. A method according to claim 1, comprising generating the data stored in the data memory for the path segments to be traveled by automatically travelling the area to be worked under the control of a program comprising steering rules for automatically finding the course and covering the area while simultaneously storing the path segments traveled, and, if required, subsequently optimizing the path by minimizing at least one of the total path length and the total working time, and generating corresponding path segment data.

8. A floor-cleaning machine having a right and left long side comprising:
   a chassis with driving and steering means;
   means for cleaning the floor area covered;
   a data memory for storing a retrievable sequence of path segments;
   one or more position-recognizing sensors;
   a control unit controlling the driving and steering means in dependence upon data stored in said data memory and upon data supplied by said position-recognizing sensors;
   two wheels adapted to be driven independently, one of said wheels being disposed on the left side and the other one on the right side of the machine;
   at least one non-driven freely pivotable aligning wheel;
   angular momentum transducers mounted at both said driven wheels as sensors connected with said control unit to measure the path traveled by each of said two independently driven wheels; and
   at least one of said position-recognizing sensors being connected to said control unit on at least one of the long sides of the machine.

9. A floor-cleaning according to claim 8, comprising one or more sensors for recognizing obstacles and for triggering at least one of bypassing and emergency stop maneuvers.

* * * * *